United States Patent [19]
Mackey

[11] Patent Number: 5,259,640
[45] Date of Patent: Nov. 9, 1993

[54] APPARATUS AND METHODS FOR INHIBITING JACKKNIFING OF ARTICULATED VEHICLES

[76] Inventor: Patrick J. Mackey, 91-3 Woodridge Crescent, Ottawa, Ontario, Canada, K2B 7T2

[21] Appl. No.: 701,069

[22] Filed: May 16, 1991

[51] Int. Cl.$^5$ ............................................. B62D 53/08
[52] U.S. Cl. ..................... 280/432; 280/433; 280/438.1; 280/446.1; 280/455.1
[58] Field of Search ............ 280/432, 433, 428, 446.1, 280/455.1, 459, 426, 438.1, 441.1, 448

[56] References Cited

U.S. PATENT DOCUMENTS

| | | | |
|---|---|---|---|
| 2,667,364 | 1/1954 | Colpo | 280/438.1 |
| 3,328,051 | 6/1967 | Hope | 280/455.1 |
| 3,520,557 | 7/1970 | Kamman et al. | 280/438.1 |
| 3,701,547 | 10/1972 | Goold | 280/455.1 |
| 3,850,449 | 11/1974 | Link et al. | 280/432 |
| 3,874,699 | 4/1975 | Hayes et al. | 280/432 |
| 4,300,785 | 11/1981 | Mettetal | 280/432 |
| 4,385,772 | 5/1983 | Mackey | 280/432 |
| 4,405,146 | 9/1983 | Mitchell | 280/432 |
| 4,585,248 | 4/1986 | Miller et al. | 280/432 |
| 4,706,984 | 11/1987 | Esler et al. | 280/432 |
| 4,720,118 | 1/1988 | Schultz et al. | 280/432 |
| 4,744,581 | 5/1988 | Cables | 280/432 |
| 4,763,916 | 8/1988 | Ratsko et al. | 280/455.1 |
| 4,840,256 | 6/1989 | Webb | 280/446.1 |
| 5,069,472 | 12/1991 | Parr et al. | 280/432 |
| 5,098,115 | 3/1992 | Haire et al. | 280/432 |

Primary Examiner—Margaret A. Focarino
Assistant Examiner—Anne Boehler
Attorney, Agent, or Firm—Nixon & Vanderhye

[57] ABSTRACT

The tractor mounts a passive damping constraint system and a fifth wheel brake between the fifth wheel and tractor frame. The fifth wheel is secured to the trailer for rotation therewith relative to the tractor. The constraint system passively resists rotary movement of the trailer and tractor about the kingpin. Upon reaching a predetermined angular relation indicative of a jackknife condition, the fifth wheel brake system is actuated and the driver alerted. Upon manual braking, the fifth wheel brake and passive damping constraint systems are deactuated. Where hard braking is required, the fifth wheel braking system is again activated to assist the driver to prevent the jackknife condition. The fifth wheel braking and passive damping constraint systems are deactivated upon actuation of the turn signals. To prevent the trailer from over-running the tractor, switches are activated upon relative longitudinal movement of the trailer and tractor to actuate the trailer brakes to prevent the trailer from over-running the tractor.

13 Claims, 3 Drawing Sheets

APPARATUS AND METHODS FOR INHIBITING JACKKNIFING OF ARTICULATED VEHICLES

BACKGROUND AND SUMMARY OF THE INVENTION

The present invention relates to apparatus and methods for preventing or inhibiting jackknifing of articulated vehicles and particularly relates to a passive damping constraint system for inhibiting an incipient jackknife condition while affording maneuverability during onset of a jackknife condition and further enabling automatic braking of the trailer in response to trailer speed in excess of tractor speed.

The present invention constitutes an improvement over the prior anti-jackknifing device set forth in my U.S. Pat. No. 4,385,772, dated May 31, 1983. In that patent, the fifth wheel and an accompanying rigid support member are mounted for pivotal movement on a rigid support structure secured to the frame of a tractor. The rigid support member includes side rails which mate with locating channels on the underside of the trailer when the trailer is coupled to the fifth wheel. Thus, the fifth wheel and accompanying rigid support member are mounted for rotation with the trailer relative to the tractor and about a generally vertical axis. The kingpin is, of course, mounted in the slotted arrangement of the fifth wheel. The fifth wheel and rigid support member, as shown in that patent, are mounted for rotation relative to the tractor through a braking system. By coupling the braking system between the trailer and the tractor to the conventional braking system of the articulated vehicle, the relative rotation of the tractor and trailer is prevented or inhibited each time the vehicle braking system is actuated.

While the anti-jackknifing device disclosed in my prior patent comprised a substantial improvement over then-known existing systems, it has been found in accordance with the present invention that a substantial part of the jackknifing problem in articulated vehicles relates to the failure to detect the onset of or an incipient jackknife condition as distinguished from normal trailer swings and transient responses for normal maneuvering of articulated vehicles, such as lane changes. Rather than responding to a jackknife condition, the present invention impedes or inhibits the oscillatory or yawing movement before the articulated vehicle obtains a predetermined angle indicative of an incipient jackknifing condition, whereas my prior patent and other devices respond, either manually or automatically, to actual jackknifing conditions. An incipient jackknifing condition may be defined as an articulation about a vertical axis of the trailer and tractor beyond a predetermined angle, for example, 10°-12° from straight-ahead centerline aligned positions of the trailer and tractor.

In accordance with the present invention therefor, there is provided a passive damping constraint system which will dampen and stabilize against trailer swings, i.e., oscillations or yaw, by a passive resistance to relative rotation between the tractor and trailer. By resisting the relative rotation about the vertical axis of the connection between the trailer and tractor, the rapidity of the yawing action and the speed of oscillations will be reduced. The maximum yawing angle under normal driving conditions will not occur as frequently using the passive damping constraint system hereof.

Further, the present invention not only inhibits the oscillatory and yawing relative motion of the trailer and tractor under normal driving conditions, but alerts the driver to an incipient jackknife condition, permitting the driver to maximize manual handling of the vehicle at the indicated onset of the jackknife condition. More particularly, a sensing system detects the relative angular alignment of the tractor and trailer from a predetermined alignment, (preferably the centerline alignment of the tractor and trailer with no angular deviation therebetween) and, upon obtaining a predetermined angular alignment, actuates a braking unit which will vigorously dampen and impede further angular displacement of the trailer relative to the tractor. Simultaneously, an alarm device, either audio or visual or both, coupled to the system will alert the driver to the incipient jackknife condition, affording the driver a manageable interval to react and manually control against the onset of a potential jackknife. If the driver reacts by applying the vehicle braking system, i.e., pressing the brake pedal, the present system is arranged, in response to application of vehicle braking, to deactivate the passive constraint system, as well as the fifth wheel braking system. This allows the driver full unimpeded manual control of the vehicle once alerted to the incipient jackknife condition. Upon manually restoring stability, the passive damping constraint system and the automatic fifth wheel braking system are automatically reactivated upon release of the vehicle brake pedal.

In another aspect of the present invention, the passive damping constraint system and fifth wheel braking system can be readily deactivated when normal vehicle maneuvering is required, such as docking the vehicle to a loading platform or the like. Thus, a master switch is provided in the circuitry of these systems operable by the vehicle driver so that these systems are shut down during normal maneuvers. Additionally, the systems may be deactivated during maneuvering on the road, for example, when changing lanes or turning corners. To accomplish this, the circuitry for actuation and deactuation of the passive damping constraint system and fifth wheel braking system includes normally closed switches which open upon actuation of the driver-operated turn signal. By opening the switches, the passive damping constraint and fifth wheel braking systems are deactivated, permitting the driver to change lanes under normal manual control. Once the lane change is effected and the turn signal returns to its normal position, the switches are closed to reactuate the passive damping constraint and fifth wheel braking systems.

As a further safety feature and means to prevent the development of further destabilizing forces acting on the articulated vehicle, it will also be appreciated that jackknifing sometimes occurs when trailer speed exceeds tractor speed. Thus, the trailer may overrun the tractor, causing a jackknife condition. To prevent this, the trailer kingpin is mounted to the trailer for a predetermined limited longitudinal movement relative to the trailer. Consequently, under normal pulling conditions, the tractor and trailer would be spaced a furthest distance one from the other. Switches are mounted in the rigid connecting structure along the underside of the trailer and are held normally open by their engagement with a rigid support member for mounting the fifth wheel. Should the trailer commence to overrun the tractor, the pin and slot move relative to one another (actually, the slot carried by the trailer moves forwardly relative to the pin), enabling the trailer mounted switches to be disengaged by the rigid support member mounting the fifth wheel. When these switches are disengaged, the switches close to automatically actuate the rear wheel braking system of the trailer to slow the trailer. This prevents a trailer-overspeed condition, which could result in a jackknife condition. When these switches close, an audible or visual alarm also alerts the driver to this overruning condition so that further preventative action can be taken by the driver. Upon braking the trailer, the trailer will move rearwardly relative to the tractor. The rigid support member mounting the fifth wheel will once again engage the switches and thereby deactuate the braking system for the rear wheels of the trailer.

In a preferred embodiment according to the present invention, there is provided apparatus for preventing a jackknife condition in an articulated vehicle, including a tractor and a trailer, comprising a tractor having a rigid support structure and a braking system, a support member rotatably carried by the rigid support structure for non-rotatable attachment to the trailer and a fifth wheel carried by the support member for rotation therewith. Means are provided interconnecting the support member and the rigid support structure for positively resisting relative rotation of the support member and the rigid support structure from an alignment thereof corresponding to a predetermined alignment of the tractor and trailer. Also provided are a switch for generating a signal in response to a predetermined angular rotation of the tractor and trailer relative to one another from the predetermined alignment thereof to an alignment indicative of an incipient jackknife condition and a brake for braking relative rotation of the support member and the rigid support structure in response to the signal.

In a further preferred embodiment according to the present invention, there is provided apparatus for preventing a jackknife condition in an articulated vehicle, including a tractor and a trailer, comprising a tractor having a rigid support structure and a braking system, a support member rotatably carried by the rigid support structure for non-rotatable attachment to the trailer, a fifth wheel carried by the support member for rotation therewith and a switch for generating a signal in response to a predetermined angular rotation of the tractor and trailer relative to one another from a predetermined rotational alignment thereof to an alignment indicative of an incipient jackknife condition. A brake is provided for braking relative rotation of the support member and the rigid support structure in response to the signal, with means for deactuating the brake in response to actuation of the tractor braking system thereby freeing the vehicle for manual control.

In a further preferred embodiment according to the present invention, there is provided a method for preventing a jackknife condition in an articulated vehicle comprising a tractor and a trailer, comprising the steps of passively resisting relative rotation of the tractor and the trailer from a predetermined alignment thereof, actuating a switch in response to a predetermined angular rotation of the tractor and trailer relative to one another from the predetermined alignment thereof to an alignment indicative of an incipient jackknife condition and applying a braking force to further resist relative rotation of the tractor and the trailer beyond the predetermined alignment thereof indicative of the incipient jackknife condition in response to actuation of the switch.

Accordingly, it is a primary object of the present invention to provide a novel and improved anti-jackknifing system for preventing the onset of a jackknife condition in an articulated vehicle wherein the system (i) automatically constrains the swinging or yawing oscillatory movement of the trailer relative to the tractor to inhibit an incipient jackknife condition, (ii) enables the driver of the vehicle to be alerted to the incipient jackknife condition, e.g., by visual or audible alarm, while simultaneously actuating the fifth wheel braking system to avert such condition, (iii) permits the driver once alerted to obtain full manual control over the vehicle by deactivating the passive damping constraint and fifth wheel braking systems in response to the application of brake pedal pressure and, subsequently, upon application of full brake pedal pressure, to reactuate the fifth wheel braking system, (iv) permits the driver to deactivate those systems during normal maneuvering on the road or docking and the like, and (v) prevents an overspeed condition of the trailer relative to the tractor which oftentimes leads to a jackknife condition.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to a present preferred embodiment of the invention, an example of which is illustrated in the accompanying drawings.

Figure 1:
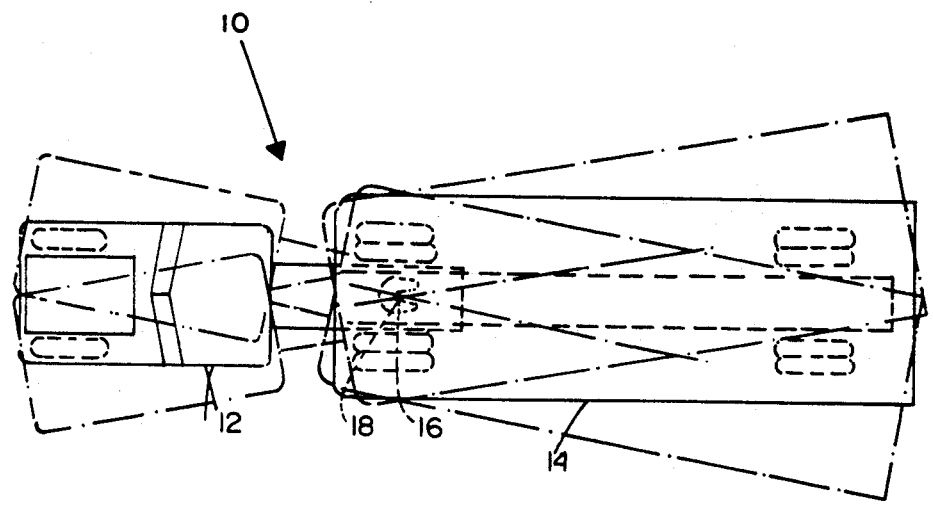
FIG. 1 is a schematic plan view illustrating an articulated vehicle and the motions associated therewith showing incipient jackknife conditions.

Referring now to the drawings, particularly to FIG. 1, there is illustrated an articulated vehicle, generally designated 10, having a tractor 12 and a trailer 14 rotatable relative to one another about a generally vertical axis 16 defined by a kingpin which connects trailer 14 to the fifth wheel 28 of the tractor 12. From a review of the drawing figure, the dot-dashed lines illustrate the various relative positions that the tractor and trailer, 12 and 14, respectively, may obtain due to relative yawing or swinging movement. Generally, the tractor and trailer under normal driving conditions remain aligned one with the other so that there is little or no angular deviation between their respective centerlines. However, as a practical matter, due to road, wind and other conditions, the trailer and tractor will obtain various degrees of angular deviation relative to one another. For example, wind action may cause the trailer to yaw to one side and hence rotate a number of degrees relative to the tractor. Any slight turning condition of the tractor relative to the trailer will likewise cause an angular deviation between the tractor and trailer. When the angular deviation reaches a certain predetermined angle, an incipient jackknife condition is defined. For example, when the tractor and trailer reach an angular deviation of approximately 10°–12° relative to one another, this signifies an incipient jackknife condition and a condition to which the driver should be alerted.

Before reaching such angular position, however, it has been found in accordance with the present invention that a passive damping constraint system will prevent rapid and wide angular relative motions of the tractor and trailer such that the incipient jackknife condition under most normal driving conditions is not obtained. To accomplish this, the tractor and trailer are coupled to one another through a passive damping constraint system, generally designated 20 in FIG. 2, and a fifth wheel braking system, generally designated 22, also in FIG. 2. More particularly, a rigid support structure 24 for the passive damping constraint system hereof is secured to the fixed main frame or chassis, not shown, of the tractor 12. Transversely spaced channels 27 opening toward one another are secured along the underside of the trailer 14. Disposed between the fifth wheel braking system 22 and trailer 14 and carried by the tractor 12 is the fifth wheel 28 and a rigid support member 30 for mounting the fifth wheel 28 thereto and for rotation with trailer 14. Support member 30 preferably comprises a shaped plate 32 carried on a shaft 40 coupled to tractor 12. Plate 32 includes transversely extending elevated flanges 34 for engagement in the laterally inwardly opening tracks 36 of channels 27 along the underside of trailer 14. Fifth wheel 28 has depending lugs 38 which pivotally connect with upstanding lugs 39 formed on plate 32 whereby the fifth wheel may rotate about a horizontal axis relative to the frame 32. Thus, plate 32 and fifth wheel 28 are carried by tractor 12 and, when the tractor 12 and trailer 14 are releasably attached to one another, plate 32 and fifth wheel 28 are carried for rotary movement with the trailer relative to the tractor.

Figure 2:
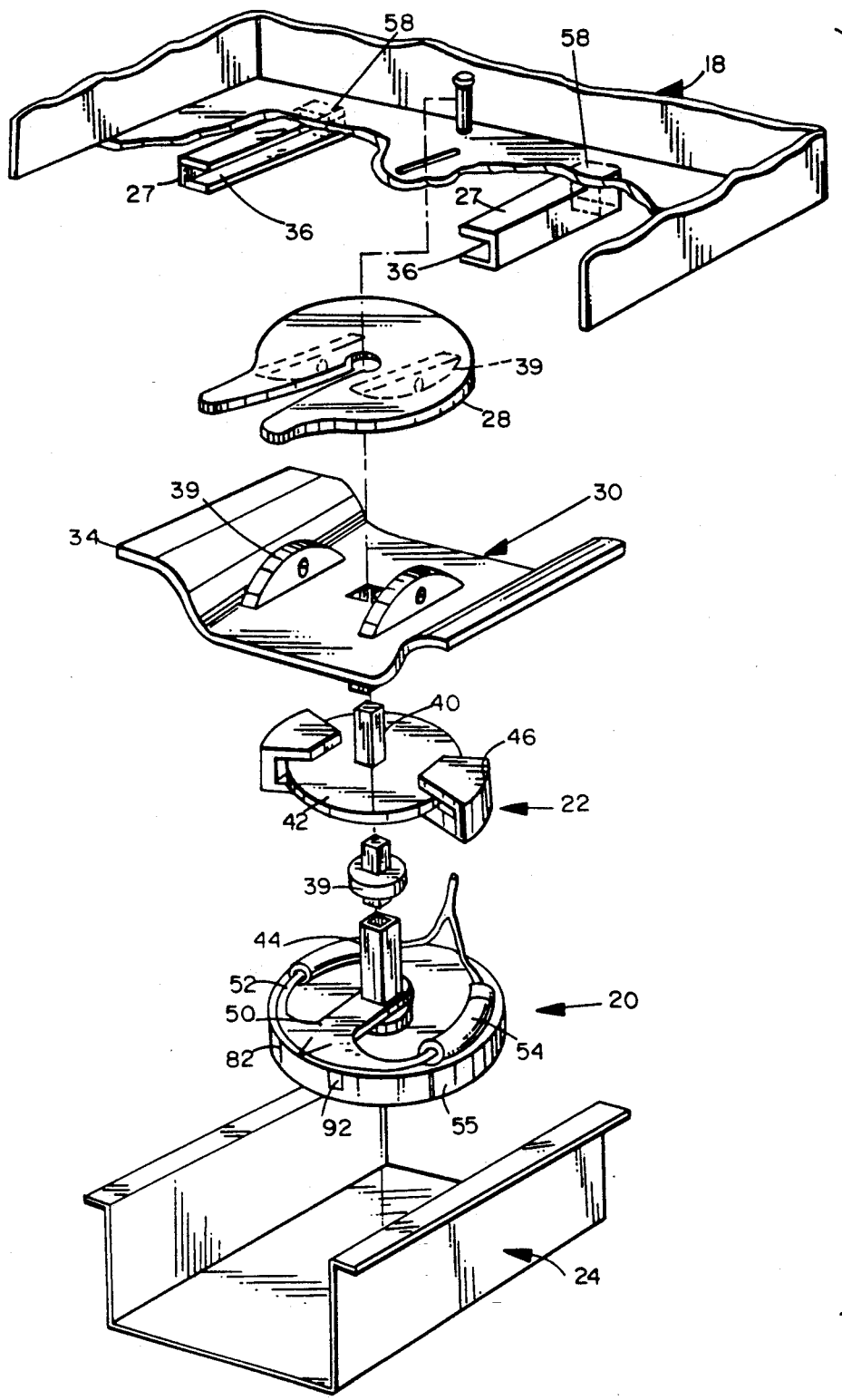
FIG. 2 is an exploded fragmentary perspective view of the interconnection between the tractor and trailer of the articulated vehicle.

As seen in FIG. 2, the passive constraint system 20 and fifth wheel brake system 22 are interconnected by a clutch 39 disposed therebetween. The clutch 39 includes a shaft 40 rotatable with the brake disk 42. The lower part of clutch 39 is coupled to the passive damping constraint system 20 by a shaft 44. It will be appreciated that actuation and deactuation of clutch 39 enables the coupling and decoupling of the passive damping constraint system to the fifth wheel assembly. The fifth wheel brake system 22, which includes calipers 46, is secured to tractor 12. The calipers 46 are actuated by suitable well-known mechanisms under control of a solenoid, as set forth below.

Referring now to the passive constraint system 20, the shaft 44 may be connected to a radial arm 50, in turn having arcuate leg portions 52 extending from its opposite sides into arcuate cylinders 54. The arcuate cylinders provide a dashpot action upon rotational movement of shaft 44, arm 50 and legs 52. The base 55 of the damping constraint system 20 is secured to the support structure 24 of the tractor. Therefore, the dashpot action constrains the rotational movement of shaft 44 relative to the tractor. Thus, when clutch 39 is engaged, rotational movement of the trailer relative to the tractor is restrained or inhibited.

Figure 3:
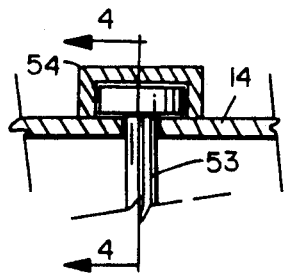
FIGS. 3 and 4 are enlarged fragmentary cross-sectional views illustrating the relative longitudinal sliding connection between the trailer and tractor.
Figure 4:
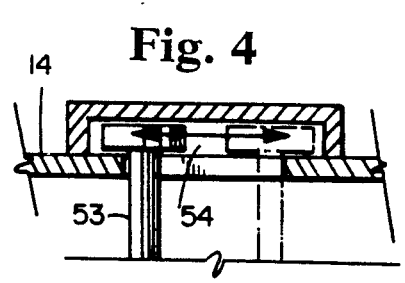

Referring to FIGS. 3 and 4, and for reasons which will become clear from the ensuing description, kingpin 53 is disposed in a longitudinally extending slot 54 formed along the underside of trailer 14. Kingpin 53 extends into the fifth wheel opening and is locked therein by conventional means, not shown, when the trailer and tractor are coupled to one another. Consequently, relative longitudinal movement of the trailer and tractor, limited by the extent of slot 54, is permitted. Further, for reasons which will become clear, pressure switches 58 are disposed in the forward ends of the channels 27 as illustrated in FIG. 2.

Figure 5:
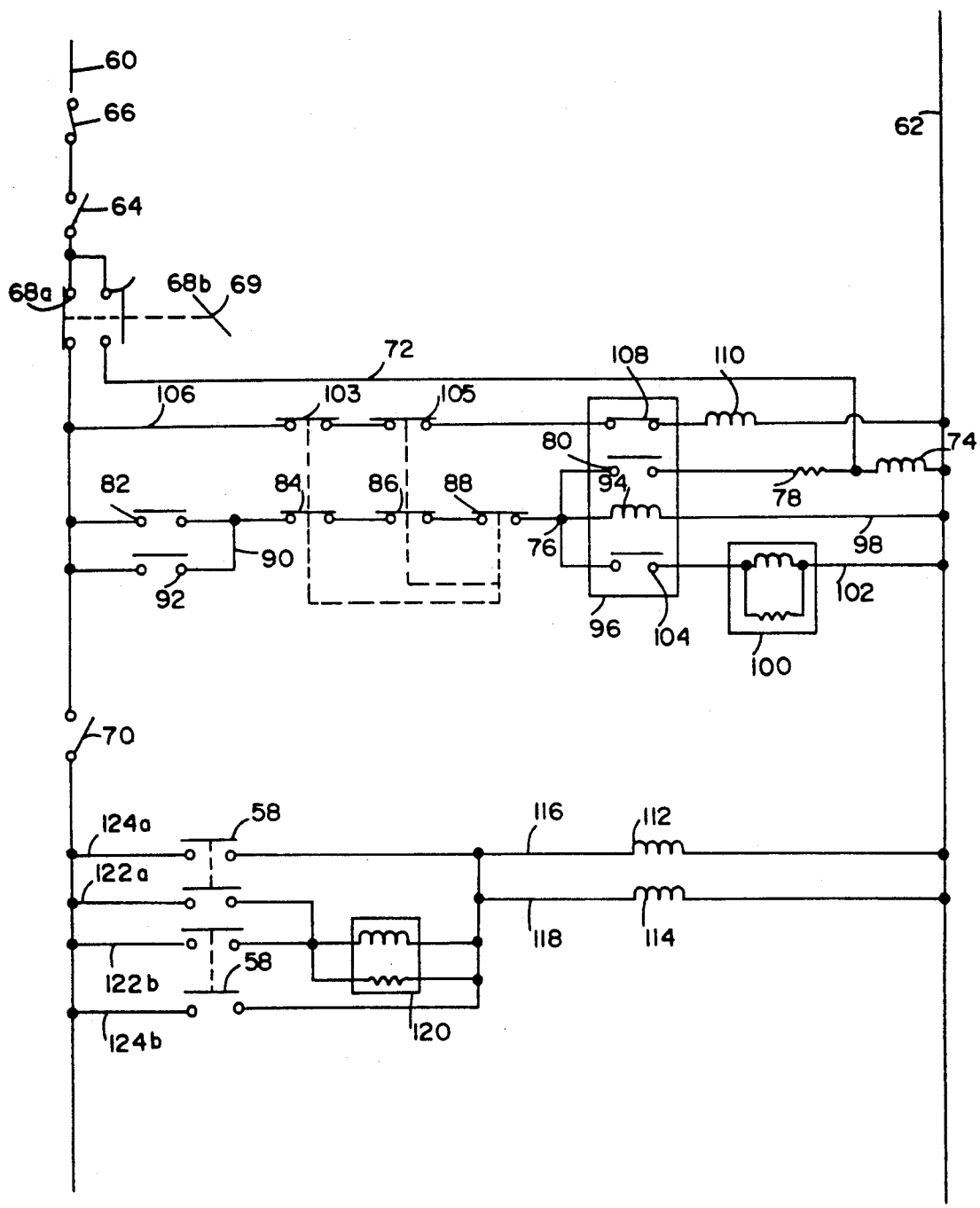
FIG. 5 is a schematic electrical diagram of a control system for the anti-jackknifing condition of the present invention.

Referring now to FIG. 5, there is illustrated an electrical circuit schematic for automatic operation of the passive damping constraint and fifth wheel braking systems hereof. The circuit comprises a supply line 60 connected to a suitable source of electrical energy, not shown, and a ground line 62. A master driver-controlled on/off switch 64 is provided in supply line 60, together with a fuse 66. Normally closed contact 68a also lies in line 60 and is opened upon application of a first brake pressure on the brake pedal 69 of the vehicle. A driver-controlled on/off switch 70 is also disposed in line 60 between the circuitry associated with the fifth wheel brake and passive damping constraint systems and the rear wheel braking system of the trailer. Line 72 interconnects supply line 60 and ground line 62 through normally open contact 68b actuated by the driver's brake pedal and a fifth wheel brake solenoid 74, actuation of which causes calipers 46 to grip and brake the brake disk 42. Between solenoid 74 and a junction 76, there is provided a resistor 78 and normally open contact 80. Junction 76 is connected to supply line 60 through normally open contact 82, normally closed turn signal contacts 84 and 86 and, if desired, an optional timer actuated contact 88. Connected in parallel with supply line 60 between normally open contact 82 and normally closed contact 84 is a line 90 having normally open contact 92. Contacts 82 and 92 are mounted on the base 55 of the pressure damping constraint system and are actuated, i.e., closed, in response to a predetermined angular relation between the tractor and trailer to actuate the fifth wheel braking system. The coil 94 for relay 96 is disposed in line 98 coupled between junction 76 and ground line 62. Audio and visual alarm relay 100 is connected in line 102 between ground line 62 and junction 76 through normally open contact 104. Line 106 connects between supply line 60 and ground line 62 through a pair of normally closed contacts 103 and 105, normally closed contact 108 and a coil 110 for operating clutch 39. Contacts 103 and 105 are coupled to contacts 84 and 86, respectively, such that when contacts 84 and 86 are opened and closed, contacts 103 and 105 are likewise opened and closed. Optional timer contact 88 is also coupled to contacts 84, 86, 103 and 105.

With respect to the trailer braking system, rear wheel braking solenoids 112 and 114 for actuating the rear wheel brakes of trailer 14 are connected in parallel in lines 116 and 118, respectively. The dual pressure-actuated switches 58 are connected to the brake operators 112 and 114 through a visual audio alarm relay 120, with lines 122a and 122b containing the open contacts of switches 58 being connected to relay 120 and the other line 124a and 124b being connected directly to the brake operators 112 and 114. Switch contacts 58 are normally closed except when the tractor and trailer are connected one to the other, at which time they are open.

When employing the system hereof and during normal driving conditions, the driver closes on/off switch 64 to energize the systems illustrated in FIG. 5. Consequently, the passive damping constraint unit clutch 110 is energized via line 106. The fifth wheel brake actuating solenoid 74, however, remains in a deenergized condition through the normally open contacts 68b, 80, 82 and 92. Thus, any relative angular motion of the trailer and tractor operates against the passive damping constraint system, which tends, through the dashpot action of cylinders 54, to prevent swing or yaw of the trailer relative to the tractor. When a relative rotation between the trailer and tractor obtains a predetermined angular relation indicative of an incipient jackknife condition, e.g., approximately 10°-12°, one of the contacts 82 and 92 is closed to actuate the fifth wheel braking system. Thus, with the closure of either contact 82 or 92, the coil 94 of relay 96 is energized to close normally open contact 80, thereby energizing the fifth wheel braking solenoid 74. Upon energization of relay 96, normally open contact 104 is closed to energize the visual audio alarm 100 in the driver's cab and contact 108 is opened to deenergize the passive damping constraint system. Thus, solenoid 74 actuates brake calipers 46 to brake the relative rotary movement of the tractor and trailer at the same time the driver is alerted to the incipient jackknife condition.

If the driver then applies the vehicle brake by normally pressing brake pedal 69, contact 68a opens to deenergize the fifth wheel braking system and also disable the passive damping constraint system. Full manual control of the vehicle is thus restored to the driver. Upon applying full pressure to the brake pedal 69, normally open contact 68b is closed, reenergizing solenoid 74 to actuate the fifth wheel braking system to assist the driver in preventing the jackknife condition.

To recapitulate, when the predetermined angular relationship between the trailer and tractor is exceeded, e.g., 10°-12°, one or the other of the normally open contacts 82 and 92 closes to actuate the driver alarm 100 and the fifth wheel braking system 22 and deactivate the passive damping constraint system 20 by energizing coil 94 and opening contact 108. The driver is thus alerted to the incipient jackknife condition and provided the opportunity for full manual control of the vehicle. Should the driver assume manual control and apply minimum brake pedal pressure, contact 68a opens but contact 68b does not close. This automatically shuts down the fifth wheel braking system and deactuates alarm 100 while simultaneously maintaining the passive damping constraint system in a deenergized mode. Should the driver, however, apply full pedal pressure, thereby closing contacts 68b, the fifth wheel braking system is again reactuated to assist in preventing the jackknife condition. When stability is restored, the driver releases the brake pedal 69 thereby closing contact 68a and again activating the fifth wheel and passive damping constraint systems.

During normal driving operations, it is also desirable to deactivate the passive damping constraint system and fifth wheel braking system, for example, when changing lanes. To accomplish this, operation of the turn signals will open contact 84 or 86 as well as contact 103 or 105, respectively. Opening contacts 103 and 105 ensures deenergization of the clutch solenoid 110 and hence the passive damping constraint system. Also, opening one or the other of contacts 84 or 86 ensures deenergization of the fifth wheel braking system by maintaining coil 94 deenergized. Upon return of the turn signals to their normal position, the opened contact 84 or 86 and opened contact 103 or 105 close. The fifth wheel braking system is thus once again enabled for actuation through closure of contact 82 or 92 and the passive damping system is activated through line 106. The optional timer may be employed to delay reactivation of the systems by maintaining the opened contacts 84 or 86 and 103 or 105 for a predetermined time after stability has been restored.

During an overspeed condition of the trailer vis-a-vis the tractor, the trailer advances forwardly relative to the tractor such that the open switch contacts 58 are closed. That is, the flanges 34 disengage from the switches 58 upon relative closing movement of the tractor and trailer. Closing switch contacts 58 energizes alarm 120 and actuates the brake operators 112 and 114 for the rear wheels of the trailer. Upon slowing of the trailer, the tractor moves ahead relative to the trailer, enabling the flanges 34 to engage the pressure switches to open switch contacts 58, thereby deactivating the brake operators.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for preventing a jackknife condition in an articulated vehicle, including a tractor and a trailer, comprising:

a tractor having a rigid support structure and a braking system;

a support member rotatably carried by said rigid support structure for non-rotatable attachment to the trailer;

a fifth wheel carried by said support member for rotation therewith;

a switch for generating a signal in response to a predetermined angular rotation of the tractor and trailer relative to one another from a predetermined rotational alignment thereof to an alignment indicative of an incipient jackknife condition;

a brake for braking relative rotation of said support member and said rigid support structure in response to said signal; and means for deactuating said brake in response to actuation of said tractor braking system thereby freeing the vehicle for manual control.

2. Apparatus according to claim 1 including means for alerting an individual driving the vehicle to the incipient jackknife condition thereby facilitating actuation of the tractor braking system.

3. Apparatus according to claim 1 including a pair of turn signals carried by said tractor, and means for rendering said brake inoperative in response to actuation of one of said turn signals.

4. Apparatus according to claim 3 including means for enabling said brake for actuation in response to deactuation of said turn signals.

5. Apparatus according to claim 1 in combination with said trailer, said trailer having a braking system, means connected to the fifth wheel enabling longitudinal movement of said trailer and said tractor relative to one another, a switch actuated in response to relative closing movement of said tractor and said trailer, said trailer braking system being actuated in response to actuation of said switch.

6. Apparatus for preventing a jackknife condition in an articulated vehicle, including a tractor and a trailer, comprising:
- a tractor having a rigid support structure and a braking system;
- a support member rotatably carried by said rigid support structure for non-rotatable attachment to the trailer;
- a fifth wheel carried by said support member for rotation therewith;
- means interconnecting said support member and said rigid support structure for positively resisting relative rotation of said support member and said rigid support structure from an alignment thereof corresponding to a predetermined alignment of the tractor and trailer;
- a switch for generating a signal in response to a predetermined angular rotation of the tractor and trailer relative to one another from a predetermined alignment thereof to an alignment indicative of an incipient jackknife condition;
- a brake for braking relative rotation of said support member and said rigid support structure in response to said signal; and
- means for deactuating said brake and said resisting means in response to actuation of said tractor braking system upon said incipient jackknife condition thereby freeing the vehicle for manual control.

7. Apparatus for preventing a jackknife condition in an articulated vehicle, comprising:
- a tractor having a rigid support structure and a braking system;
- a trailer;
- a support member rotatably carried by said rigid support structure for non-rotatable attachment to the trailer;
- a fifth wheel carried by said support member for rotation therewith;
- means interconnecting said support member and said rigid support structure for positively resisting relative rotation of said support member and said rigid support structure from an alignment thereof corresponding to a predetermined alignment of said tractor and said trailer;
- a switch for generating a signal in response to a predetermined angular rotation of said tractor and said trailer relative to one another from said predetermined alignment thereof to an alignment indicative of an incipient jackknife condition;
- a brake for braking relative rotation of said support member and said rigid support structure in response to said signal; and
- means connected to the fifth wheel enabling longitudinal movement of said trailer and said tractor relative to one another, a switch actuated in response to relative closing movement of said tractor and said trailer, said trailer braking system being actuated in response to actuation of said switch.

8. A method for preventing a jackknife condition in an articulated vehicle comprising a tractor and a trailer, wherein said tractor has a braking system, comprising the steps of:
- passively resisting relative rotation of said tractor and said trailer from a predetermined alignment thereof;
- actuating a switch in response to a predetermined angular rotation of the tractor and trailer relative to one another from said predetermined alignment thereof to an alignment indicative of an incipient jackknife condition;
- applying a braking force to resist relative rotation of said tractor and said trailer beyond the predetermined alignment thereof indicative of the incipient jackknife condition in response to actuation of said switch; and
- deactuating said braking force and said passive resistance in response to actuation of said tractor braking system upon said incipient jackknife condition thereby freeing the vehicle for manual control.

9. A method according to claim 8 including the step of alerting an individual driving the vehicle to the incipient jackknife condition in response to actuation of the switch.

10. A method according to claim 8 including actuating an alarm to alert a vehicle driver in response to a predetermined angular rotation of the tractor and trailer relative to one another from said predetermined alignment thereof to an alignment indicative of an incipient jackknife condition.

11. A method for preventing a jackknife condition in an articulated vehicle comprising a tractor and a trailer, wherein said tractor has a braking system, comprising the steps of:
- passively resisting relative rotation of said tractor and said trailer from a predetermined alignment thereof;
- actuating a switch in response to a predetermined angular rotation of the tractor and trailer relative to one another from said predetermined alignment thereof to an alignment indicative of an incipient jackknife condition;
- applying a braking force to resist relative rotation of said tractor and said trailer beyond the predetermined alignment thereof indicative of the incipient jackknife condition in response to actuation of said switch; and
- enabling longitudinal movement of said trailer and said tractor relative to one another, actuating a switch in response to relative closing movement of said tractor and said trailer, and actuating said trailer braking system in response to actuation of said switch.

12. A method for preventing a jackknife condition in an articulated vehicle comprising a tractor and a trailer, comprising the steps of:
- passively resisting relative rotation of said tractor and said trailer from a predetermined alignment thereof;
- actuating a switch in response to a predetermined angular rotation of the tractor and trailer relative to one another from said predetermined alignment thereof to an alignment indicative of an incipient jackknife condition;
- applying a braking force to resist relative rotation of said tractor and said trailer beyond the predetermined alignment thereof indicative of the incipient jackknife condition in response to actuation of said switch; and
- rendering said braking force inoperative in response to actuation of one of a pair of turn signals carried by said tractor.

13. A method according to claim 12 including enabling said brake for actuation in response to deactuation of said turn signals.

* * * * *